(12) United States Patent
Beck et al.

(10) Patent No.: US 9,482,317 B2
(45) Date of Patent: Nov. 1, 2016

(54) MULTI-RATIO TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 62 days.

(21) Appl. No.: 14/378,350

(22) PCT Filed: Jan. 10, 2013

(86) PCT No.: PCT/EP2013/050351
§ 371 (c)(1),
(2) Date: Aug. 13, 2014

(87) PCT Pub. No.: WO2013/124081
PCT Pub. Date: Aug. 29, 2013

(65) Prior Publication Data
US 2015/0031495 A1    Jan. 29, 2015

(30) Foreign Application Priority Data
Feb. 24, 2012   (DE) .................. 10 2012 202 810

(51) Int. Cl.
*F16H 3/62*   (2006.01)
*F16H 3/66*   (2006.01)

(52) U.S. Cl.
CPC ........ *F16H 3/62* (2013.01); *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS 3,999,448 A   12/1976  Murakami et al.
4,395,925 A   8/1983   Gaus
(Continued)

FOREIGN PATENT DOCUMENTS

DE   29 63 969 A1    4/1981
DE   199 12 480 A1   9/2000
(Continued)

OTHER PUBLICATIONS

German Search Report Corresponding to DE 10 2012 202 810.2 mailed Nov. 13, 2012.
(Continued)

*Primary Examiner* — Edwin A Young
(74) *Attorney, Agent, or Firm* — Davis & Bujold, PLLC; Michael J. Bujold

(57) ABSTRACT

A multi-ratio transmission with nine forward and one reverse gear. Sun gears of first and third gearsets (P1, P3) are couplable, via brake (04), a housing. Carrier of third gearset (P3) and sun gear of second gearset (P2) are couplable, via clutch (13), to input shaft or coupled, via brake (03), housing. Input shaft detachably couples, via clutch (16), ring gear of third gearset (P3) and, via clutch (18), carrier of second gearset (P2) and detachably couples, via clutch (78), ring gear of fourth gearset (P4). Ring gear of second gearset (P2) and carrier of first gearset (P2, P1) are connected to one another. Output shaft couples carrier and ring gear of the fourth and first gearsets (P4, P1) to one another. The sun gear of fourth gearset (P4) is coupled to the housing.

11 Claims, 3 Drawing Sheets

(56) References Cited

U.S. PATENT DOCUMENTS

| | | | |
|---|---|---|---|
| 6,572,507 B1 | 6/2003 | Korkmaz et al. | |
| 6,634,980 B1* | 10/2003 | Ziemer | F16H 3/663 |
| | | | 475/275 |
| 6,960,149 B2 | 11/2005 | Ziemer | |
| 7,549,942 B2 | 6/2009 | Gumpoltsberger | |
| 7,699,743 B2 | 4/2010 | Diosi et al. | |
| 8,210,981 B2 | 7/2012 | Bauknecht et al. | |
| 8,210,982 B2 | 7/2012 | Gumpoltsberger et al. | |
| 8,398,522 B2 | 3/2013 | Bauknecht et al. | |
| 2008/0039266 A1* | 2/2008 | Shim | F16H 3/66 |
| | | | 475/280 |
| 2009/0197733 A1 | 8/2009 | Phillips et al. | |
| 2010/0279814 A1* | 11/2010 | Brehmer | F16H 3/66 |
| | | | 475/275 |
| 2010/0331138 A1* | 12/2010 | Phillips | F16H 3/66 |
| | | | 475/278 |

FOREIGN PATENT DOCUMENTS

| | | |
|---|---|---|
| DE | 101 15 995 A1 | 10/2002 |
| DE | 10 2005 010 210 A1 | 9/2006 |
| DE | 10 2006 006 637 A1 | 9/2007 |
| DE | 10 2008 000 428 A1 | 9/2009 |
| DE | 10 2008 000 429 A1 | 9/2009 |
| DE | 10 2008 041 193 A1 | 2/2010 |
| DE | 10 2008 041 195 A1 | 2/2010 |
| DE | 10 2008 041 211 A1 | 2/2010 |
| DE | 10 2009 019 046 A1 | 11/2010 |
| DE | 10 2009 020 442 A1 | 11/2010 |
| DE | 10 2009 052 148 A1 | 5/2011 |

OTHER PUBLICATIONS

German Search Report Corresponding to DE 10 2012 202 811.0 mailed Nov. 13, 2012.
German Search Report Corresponding to DE 10 2012 202 812.9 mailed Nov. 13, 2012.
German Search Report Corresponding to DE 10 2012 202 813.7 mailed Nov. 13, 2012.
International Search Report Corresponding to PCT/EP2013/050351 mailed Mar. 18, 2013.
International Search Report Corresponding to PCT/EP2013/050352 mailed Mar. 18, 2013.
International Search Report Corresponding to PCT/EP2013/050353 mailed Mar. 18, 2013.
International Search Report Corresponding to PCT/EP2013/050355 mailed Mar. 18, 2013.
Written Opinion Corresponding to PCT/EP2013/050351 mailed Mar. 18, 2013.

* cited by examiner

| Gear | Shifting elements closed | | | | | | Gear ratio i | Gear interval φ |
|---|---|---|---|---|---|---|---|---|
| | Brake | | Clutch | | | | | |
| | 03 | 04 | 13 | 16 | 18 | 78 | | |
| 1 |  | × |  | × |  | × | 3.984 | 1.612 |
| 2 |  | × | × |  |  | × | 2.471 | 1.438 |
| 3 |  |  | × | × |  | × | 1.719 | 1.294 |
| 4 |  |  | × |  | × | × | 1.328 | 1.328 |
| 5 |  |  | × | × | × |  | 1.000 | 1.256 |
| 6 |  | × | × |  | × |  | 0.796 | 1.177 |
| 7 |  | × |  |  | × | × | 0.676 | 1.246 |
| 8 | × | × |  |  |  | × | 0.543 | 1.227 |
| 9 | × |  |  | × | × |  | 0.442 | Total |
| R | × |  |  | × |  | × | -3.453 | 9.008 |
| M | × |  |  |  | × | × | 1.328 | |
| M |  | × |  |  | × | × | 1.328 | |
| M |  |  |  | × | × | × | 1.328 | |

| Gear | Shifting elements closed | | | | | | Gear ratio | Gear interval |
|---|---|---|---|---|---|---|---|---|
| | Brake | | Clutch | | | | | |
| | 03 | 04 | 13 | 18 | 46 | 78 | i | φ |
| 1 | | x | | | x | x | 3.984 | 1.612 |
| 2 | | x | x | | | x | 2.471 | 1.438 |
| 3 | | | x | | x | x | 1.719 | 1.294 |
| 4 | | | x | x | | x | 1.328 | 1.328 |
| 5 | | | x | x | x | | 1.000 | 1.256 |
| 6 | | x | x | x | | | 0.796 | 1.177 |
| 7 | | x | | x | x | | 0.676 | 1.246 |
| 8 | x | x | | x | | | 0.543 | 1.227 |
| 9 | x | | | x | x | | 0.442 | Total |
| R | x | | | | x | x | −3.453 | 9.008 |
| M | x | | | x | | x | 1.328 | |
| M | | x | | x | | x | 1.328 | |
| M | | | | x | x | x | 1.328 | |

Fig. 5

MULTI-RATIO TRANSMISSION

This application is a National Stage completion of PCT/EP2013/050351 filed Jan. 10, 2013, which claims priority from German patent application serial no. 10 2012 202 810.2 filed Feb. 24, 2012.

FIELD OF THE INVENTION

The present invention concerns a multi-ratio transmission of planetary design, in particular an automatic transmission for a motor vehicle.

BACKGROUND OF THE INVENTION

According to the prior art, automatic transmissions in particular for motor vehicles comprise planetary gearsets which are shifted by means of frictional or shifting elements such as clutches and brakes, and are usually connected with a starting element which can be operated with slip and is optionally provided with a bridging clutch, such as a hydrodynamic torque converter or a fluid coupling.

Such an automatic transmission is known, for example, from DE 199 12 480 B4 by the present applicant. It comprises three single-carrier planetary gearsets as well as three brakes and two clutches for engaging six forward gears and one reverse gear, a drive input shaft and a drive output shaft, wherein the carrier of the first planetary gearset is connected permanently to the ring gear of the second planetary gearset, the carrier of the second planetary gearset to the ring gear of the third planetary gearset and the drive input shaft is connected directly to the sun gear of the second planetary gearset.

Furthermore, in this known transmission it is provided that the drive input shaft can be connected by the first clutch to the sun gear of the first planetary gearset and by the second clutch to the carrier of the first planetary gearset, the sun gear of the first planetary gearset can be connected by the first brake to a housing of the transmission and the carrier of the first planetary gearset can be connected by the second brake to the housing of the transmission, whereas the sun gear of the third planetary gearset can be connected by the third brake to the housing of the transmission. The drive output shaft of the transmission is connected permanently to the carrier of the third planetary gearset and to the ring gear of the first planetary gearset.

In addition a 9-gear multi-stage transmission is known from DE 29 36 969 A1; this comprises eight shifting elements and four planetary gearsets, one planetary gearset serving as the upstream gearset and the main transmission comprising a Simpson gearset and a further planetary gearset that serves as a reversing gearset.

Other multi-stage transmissions are known, for example, from DE 10 2005 010 210 A1 and DE 10 2006 006 637 A1 by the present applicant.

In general, automatically shifted vehicle transmissions of planetary design have already been described many times in the prior art and are continually undergoing further development and improvement. These transmissions should take up little structural space, in particular requiring a small number of shifting elements, and in sequential shifting operations should avoid double shifts, i.e. engagement or disengagement of two shifting elements at a time, so that for shifting operations in defined gear groups in each case only one shifting element is changed.

From DE 10 2008 000 428 A1 by the present applicant a multi-stage transmission of planetary design is known, which comprises a drive input and a drive output arranged in a housing. In this known transmission there are at least four planetary gearsets, denoted in what follows as the first, second, third and fourth planetary gearsets, at least eight rotating shafts—denoted in what follows as the drive input shaft, the drive output shaft and the third, fourth, fifth, sixth, seventh and eighth shafts—and at least six shifting elements including brakes and clutches, whose selective engagement produces various gear ratios between the drive input and the drive output, so that preferably nine forward gears and one reverse gear can be produced.

In this case the first and second planetary gearsets, preferably designed as minus planetary gearsets, namely ones with a negative fixed transmission gear ratio, form a shiftable upstream gearset whereas the third and fourth planetary gearsets form a main gearset.

In this known multi-stage transmission it is provided that the carriers of the first and second planetary gearsets are coupled with one another by the fourth shaft, which is connected to an element of the main gearset, the ring gear of the first planetary gearset is coupled to the sun gear of the second planetary gearset by way of the eighth shaft, which can be connected detachably to the drive input shaft by a first clutch, and the sun gear of the first planetary gearset can be coupled by means of the third shaft via a first brake to a housing of the transmission and can be detachably connected, via a second clutch, to the drive input shaft, whereas the ring gear of the second planetary gearset can be coupled by means of the fifth shaft, via a second brake, to a housing of the transmission. In addition the seventh shaft is permanently connected to at least one element of the main gearset and can be coupled by a third brake to the housing of the transmission, whereas the sixth shaft is permanently connected to at least one further element of the main gearset and can be detachably connected to the drive input shaft by means of a third clutch; the drive output shaft is permanently connected to at least one further element of the main gearset.

Preferably, in this known transmission the fourth shaft is permanently connected to the ring gear of the third planetary gearset, whereas the sixth shaft is permanently connected to the ring gear of the fourth planetary gearset and to the carrier of the third planetary gearset, and can be detachably connected by the third clutch to the drive input shaft. Furthermore, the seventh shaft is connected permanently to the sun gears of the third and fourth planetary gearsets and can be coupled by the third brake to a transmission housing. In this case, the drive output takes place by way of the drive output shaft which is permanently connected to the carrier of the fourth planetary gearset. In addition, the third and fourth planetary gearsets can be combined or reduced to a Ravigneaux gearset with a common carrier and a common ring gear.

According to the state of the art the shifting elements of multi-stage transmissions designed in that way, which are usually in the form of disk clutches or disk brakes, are actuated hydraulically, but this results disadvantageously in high hydraulic losses. To avoid these actuation losses, it would be particularly advantageous to use shifting elements that can be actuated only as required, for example electromechanically actuated shifting elements.

To enable the use of shifting elements that can be actuated as required, the shifting elements, clutches in particular, have to be easily accessible from outside.

Shifting elements that can be actuated as required are understood to mean, in particular, ones that need energy only for changing their shifting condition. This also includes hydraulically actuated shifting elements whose shifting condition can be maintained by closing a valve.

SUMMARY OF THE INVENTION

The purpose of the present invention is to propose a multi-stage transmission of the type mentioned to begin with, comprising nine forward gears and one reverse gear having appropriate gear ratios, wherein the structural complexity, component loading and overall size are optimized, and in addition the efficiency in terms of drag losses and gearing losses is improved. Furthermore the shifting elements of the transmission should be easily accessible from outside, whereby the fitting of shifting elements that can be actuated as required is facilitated. Moreover, the transmission should be suitable for both standard and also front-transverse mounting designs.

Accordingly, a multi-stage transmission of planetary design is proposed, which comprises a drive input and a drive output. The multi-stage transmission is accommodated at least partially in a housing. Furthermore, it comprises at least four planetary gearsets, called the first, second, third and fourth planetary gearsets in what follows, eight rotating shafts—called the drive input shaft, the drive output shaft and the third, fourth, fifth, sixth, seventh and eighth shafts in what follows—and six shifting elements, preferably in the form of frictional shifting elements or interlocking shifting elements, including brakes and clutches, whose selective engagement produces various gear ratios between the drive input and the drive output, such that preferably nine forward gears and one reverse gear can be obtained.

The planetary gearsets of the transmission are preferably designed as minus planetary gearsets.

As is known, a simple minus planetary gearset has a sun gear, a ring gear and a carrier on which planetary gearwheels are mounted to rotate, each of the planetary gearwheels meshing with the sun gear and the ring gear. Thus, if the carrier is held fixed, the ring gear rotates in the opposite direction to the sun gear. In contrast a simple plus planetary gearset has a sun gear, a ring gear and a carrier on which inner and outer planetary gearwheels are mounted to rotate, such that all the inner planetary gearwheels mesh with the sun gear and all the outer planetary gearwheels mesh with the ring gear and each inner planetary gearwheel meshes with a respective outer planetary gearwheel. Accordingly, if the carrier is held fixed, the ring gear rotates in the same direction as the sun gear and the fixed transmission gear ratio is positive.

In a preferred embodiment of the invention, the sun gear of the first planetary gearset is connected to the fourth shaft, which is connected to the sun gear of the third planetary gearset and can be coupled by a second brake to the transmission housing, the drive input shaft can be connected detachably by a first clutch to the third shaft, which is connected to the carrier of the third planetary gearset and to the sun gear of the second planetary gearset and which can be coupled to the transmission housing by a first brake. Moreover, the drive input shaft can be detachably connected by a second clutch to the sixth shaft, which is connected to the ring gear of the third planetary gearset, and in addition the drive input shaft can be detachably connected by a third clutch to the eighth shaft, which is connected to the carrier of the second planetary gearset and can be detachably connected by a fourth clutch to the seventh shaft, which is connected to the ring gear of the fourth planetary gearset.

Furthermore the fifth shaft of the transmission is connected to the ring gear of the second planetary gearset and to the carrier of the first planetary gearset, whereas the drive output shaft of the transmission is connected to the carrier of the fourth planetary gearset and to the ring gear of the first planetary gearset, and the sun gear of the fourth planetary gearset is coupled to the transmission housing.

A connection between two elements is in particular understood to be a connection by means of a single shaft, "Can be connected" is understood to mean that it is possible to connect two elements, in particular by means of a shaft and a shifting element.

In that the first, second and third clutches are arranged on the drive input shaft, the fourth clutch is arranged on the ring gear of a planetary gearset and the remaining shifting elements are in the form of brakes, it is ensured that all the shifting elements of the transmission can be accessed easily, so that the shifting elements can be designed as shifting elements that can be actuated as required. In other embodiments shifting elements of the transmission can be in the form of hydraulic shifting elements.

In a further embodiment of the invention, starting with the embodiment just described, the second clutch can be replaced by a fifth clutch so that the sixth shaft is connected to the sun gear of the third planetary gearset and the drive input shaft is connected to the ring gear of the third planetary gearset. In this case the fifth clutch connects the sixth shaft, which is connected to the sun gear of the third planetary gearset, and the fourth shaft, which is connected to the sun gear of the first planetary gearset, detachably to one another. According to a further development of this embodiment according to the invention, the first clutch can be replaced by a sixth clutch, which detachably connects the third shaft to the sixth shaft.

The design of the multi-stage transmission in accordance with the invention ensures that the shifting elements of the transmission are easily accessible, so that the shifting elements can certainly be designed in the form of shifting elements that can be actuated as required. Moreover, particularly for passenger cars suitable gear ratios are available and the multi-stage transmission has a high overall spread, which improves driving comfort and reduces fuel consumption significantly.

Furthermore, since the multi-stage transmission according to the invention has a small number of shifting elements its structural complexity is reduced considerably. Advantageously, with the multi-stage transmission according to the invention starting can be carried out by means of a hydrodynamic converter, an external starting clutch or even with other suitable external starting elements. It is also conceivable to enable a starting process with a starting element integrated in the transmission. Preferably, a starting element which is actuated in the first forward gear and the reverse gear is suitable.

Moreover, the efficiency of the multi-stage transmission in the main driving gears is good in relation to drag and gearing losses.

Advantageously, the torques imposed on the shifting elements and planetary gearsets of the multi-stage transmission are small, so that wear in the multi-stage transmission is advantageously reduced. Furthermore, since the torques are small the dimensions of the transmission components can be made smaller, whereby the fitting space and the corresponding costs can be reduced. Moreover the shafts, shifting elements and planetary gearsets also rotate at low speeds.

Besides, the transmission according to the invention is designed in such manner as to enable adaptation to various drive-train designs, in terms of both force flow direction and also spatial considerations.

BRIEF DESCRIPTION OF THE DRAWINGS

Below, an example of the invention will be explained in greater detail with reference to the attached figures, which show:

FIG. 5: An example of a shifting scheme for a multi-stage transmission as in FIGS. 3 and 4.

DETAILED DESCRIPTION OF THE PREFERRED EMBODIMENTS

Figures 1, 2:
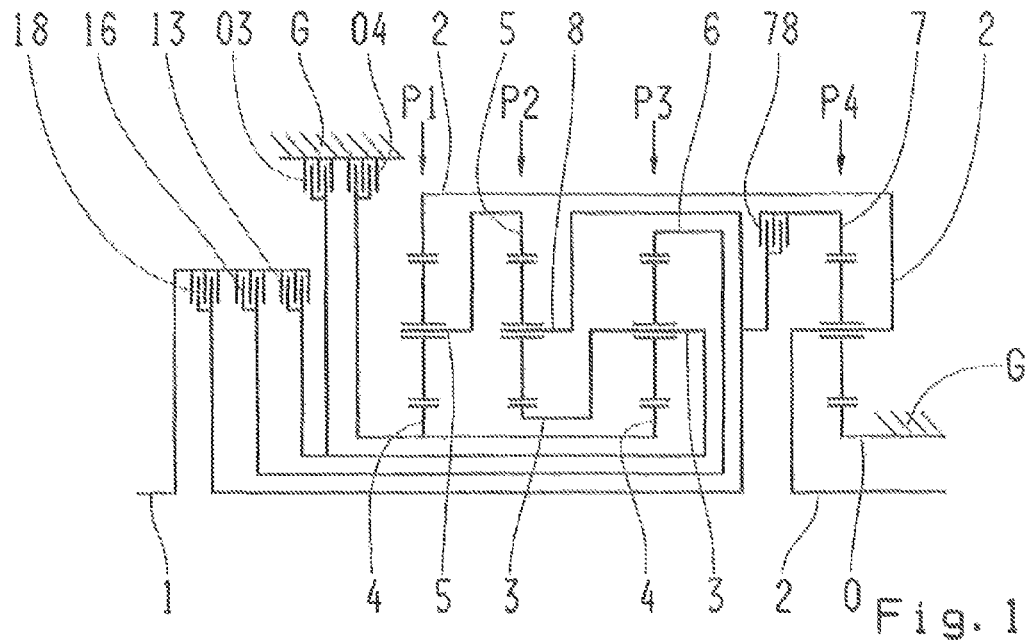
FIG. 1: A schematic representation of a first preferred embodiment of a multi-stage transmission according to the invention.
FIG. 2: An example shifting scheme for a multi-stage transmission as in FIG. 1.

FIG. 1 shows a multi-stage transmission according to the invention having a drive input shaft 1, a drive output shaft 2 and four planetary gearsets P1, P2, P3 and P4, which are arranged in a housing G. In the example shown in FIG. 1 the planetary gearsets P1, P2, P3 and P4 are designed as minus planetary gearsets. According to the invention, at least one of the planetary gearsets P1, P2, P3, P4 can be a plus planetary gearset if at the same time the carrier and ring gear connection is exchanged and, compared with the minus planetary gearset design, the value of the fixed transmission ratio is increased by 1.

In the example embodiment shown, as viewed axially P1, P2, P3 P4 are arranged in the sequence P1 (first planetary gearset), P2 (second planetary gearset), P3 (third planetary gearset and P4 (fourth planetary gearset). According to the invention, the axial sequence of the individual planetary gearsets and the arrangement of the shifting elements can be chosen freely so long as it enables the elements to be connected appropriately.

As can be seen from FIG. 1, six shifting elements are provided, namely two brakes 03 and 04 and four clutches 13, 16, 18 and 78. The spatial arrangement of the shifting elements can be as desired and is restricted only by their size and the external shape. The clutches and brakes of the transmission are preferably in the form of frictional shifting elements or disk shifting elements, but they can also be interlocking shifting elements.

With these shifting elements a selective engagement of nine forward gears and one reverse gear can be obtained. The multi-stage transmission according to the invention has a total of eight rotating shafts, namely 1, 2, 3, 4, 5, 6, 7 and 8, of which the drive input shaft is the first shaft 1 and the drive output shaft is the second shaft 2 of the transmission.

According to the invention, in the multi-stage transmission according to FIG. 1 it is provided that the sun gear of the first planetary gearset P1 is connected to the fourth shaft 4, which is connected to the sun gear of the third planetary gearset P3 and can be coupled by means of a second brake 04 to the housing G of the transmission, whereas the drive input shaft 1 can be detachably connected by a first clutch 13 to the third shaft 3, which is connected to the carrier of the third planetary gearset P3 and the sun gear of the second planetary gearset P2 and can be coupled to the housing G by a first brake 03.

As can be seen from FIG. 1, the drive input shaft 1 can be detachably connected by a second clutch 16 to the sixth shaft 6, which is connected to the ring gear of the third planetary gearset P3; in addition, the drive input shaft can be detachably connected by a third clutch 18 to the eighth shaft 8, this eighth shaft 8 is connected to the carrier of the second planetary gearset P2 and, is detachably connected, via a fourth clutch 78, to the seventh shaft 7 which is connected to the ring gear of the fourth planetary gearset P4.

Referring to FIG. 1, the fifth shaft 5 is connected to the ring gear of the second planetary gearset P2 and to the carrier of the first planetary gearset P1, whereas the drive output shaft 2 is connected to the carrier of the fourth planetary gearset P4 and to the ring gear of the first planetary gearset P1, while the sun gear of the fourth planetary gearset P4 is coupled to the housing G (shaft 0).

FIG. 2 shows an example shifting scheme for a multi-stage transmission as in FIG. 1. For each gear three shifting element are closed. The shifting scheme shows the respective transmission ratios i of the individual gear steps and the gear intervals or step intervals φ to the next-higher gear determined therefrom, the value of the transmission's spread being 9.008 overall.

The values for the fixed transmission ratios of the planetary gearsets P1, P2, P3, P4 designed as minus planetary gearsets in the example shown are −3.900, −2.146, −1.634 and −3.045 respectively. FIG. 2 shows that in a sequential shift pattern, in each case only one shifting element has to be engaged and one shifting element disengaged, since two adjacent gear steps use two shifting elements together. It can also be seen that a large spread with small gear intervals is achieved.

The first forward gear is obtained by closing the second brake 04 and the second and fourth clutches 16, 78, the second forward gear by closing the second brake 04 and the first and fourth clutches 13, 78, the third forward gear by closing the first, second and fourth clutches 13, 16, 78, the fourth forward gear by closing the first, third and fourth clutches 13, 18, 78, the fifth forward gear, which in the example shown is designed to be a direct gear, is obtained by closing the first, second and third clutches 13, 16, 18, the sixth forward gear by closing the second brake 04 and the first and third clutches 13, 18, the seventh forward gear by closing the second brake 04 and the second and third clutches 16, 18, the eighth forward gear by closing the first and second brakes 03, 04 and the third clutch 18, and the ninth forward gear by closing the first brake 03 and the second and third clutches 16, 18. The reverse gear is obtained by closing the first brake 03 and the second and fourth clutches 16, 78.

Alternatively, the fourth forward gear can be engaged by other shifting combinations, which are denoted in FIG. 2 by M. Thus, the fourth forward gear can be obtained by closing the first brake 03 and the third and fourth clutches 18, 78, or by closing the second brake 04 and the third and fourth clutches 18, 78, or by closing the second, third and fourth clutches 16, 18 and 78.

Since the second and fourth clutches 16, 78 are closed in both the first forward gear and the reverse gear, these shifting elements can be used as starting elements.

According to the invention, with the same transmission scheme and depending on the shifting logic different gear intervals can also be obtained, so that application-specific or vehicle-specific variation is possible.

Figure 3:
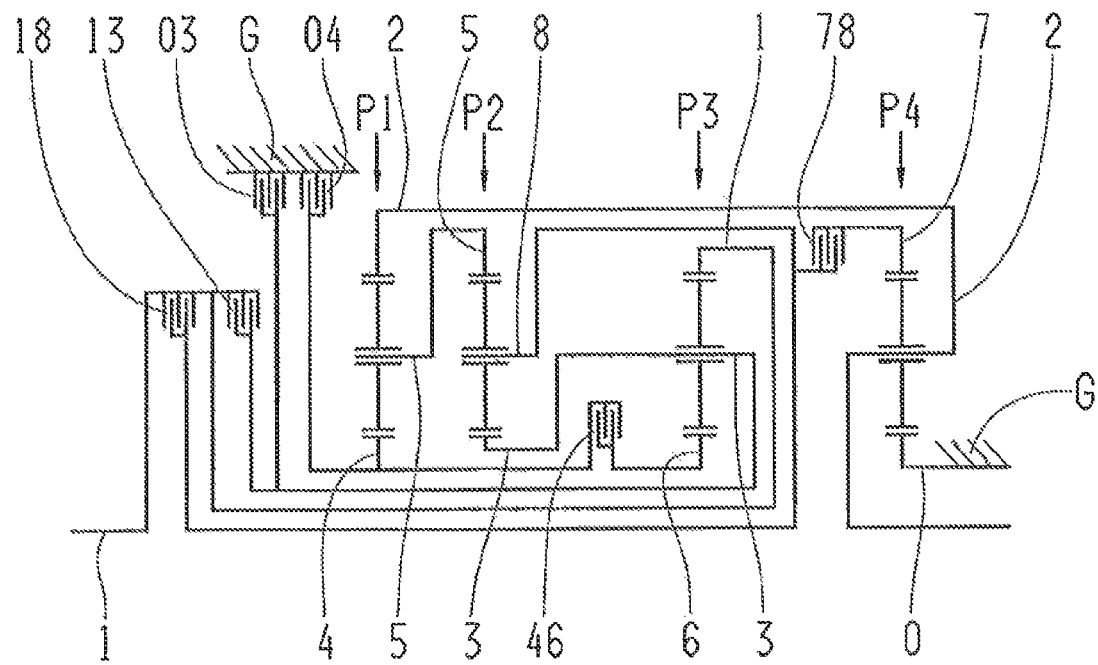
FIG. 3: A schematic representation of a second preferred embodiment of a multi-stage transmission according to the invention.

The example embodiment shown in FIG. 3 corresponds to the example embodiment according to FIG. 1, with the difference that the second clutch 16 is replaced by a fifth clutch 46, the sixth shaft 6 is connected to the sun gear of the third planetary gearset P3 and the drive input shaft 1 is connected to the ring gear of the third planetary gearset P3. In this case the fifth clutch 46 detachably connects the sixth shaft 6, which is connected to the sun gear of the third planetary gearset P3, to the fourth shaft 4 which is connected to the sun gear of the first planetary gearset P1.

In the transmission shown in FIG. 3 the sun gear of the first planetary gearset P1 is connected to the fourth shaft 4, which can be coupled by a second brake 04 to the transmission housing G and can be detachably connected by the fifth clutch 46 to the sixth shaft 6 which is connected to the sun gear of the third planetary gearset P3, whereas the drive input shaft 1 can be detachably connected by a first clutch 13 to the third shaft 3 which is connected to the carrier of the third planetary gearset P3 and to the sun gear of the second planetary gearset P2 and can be coupled by means of a first brake 03 to the housing, and in addition the drive input shaft 1 is connected to the ring gear of the third planetary gearset P3 and can be detachably connected by a third clutch 18 to the eighth shaft 8, which is connected to the carrier of the second planetary gearset P2 and which, by means of a fourth clutch 78, can be detachably connected to the seventh shaft 7 which is connected to the ring gear of the fourth planetary gearset P4. The fifth shaft 5 is connected to the ring gear of the second planetary gearset P2 and to the carrier of the first planetary gearset P1, whereas the drive output shaft 2 is connected to the carrier of the fourth planetary gearset P4 and to the ring gear of the first planetary gearset P1, and the sun gear of the fourth planetary gearset P4 is coupled to the housing G (shaft 0).

Figure 4:
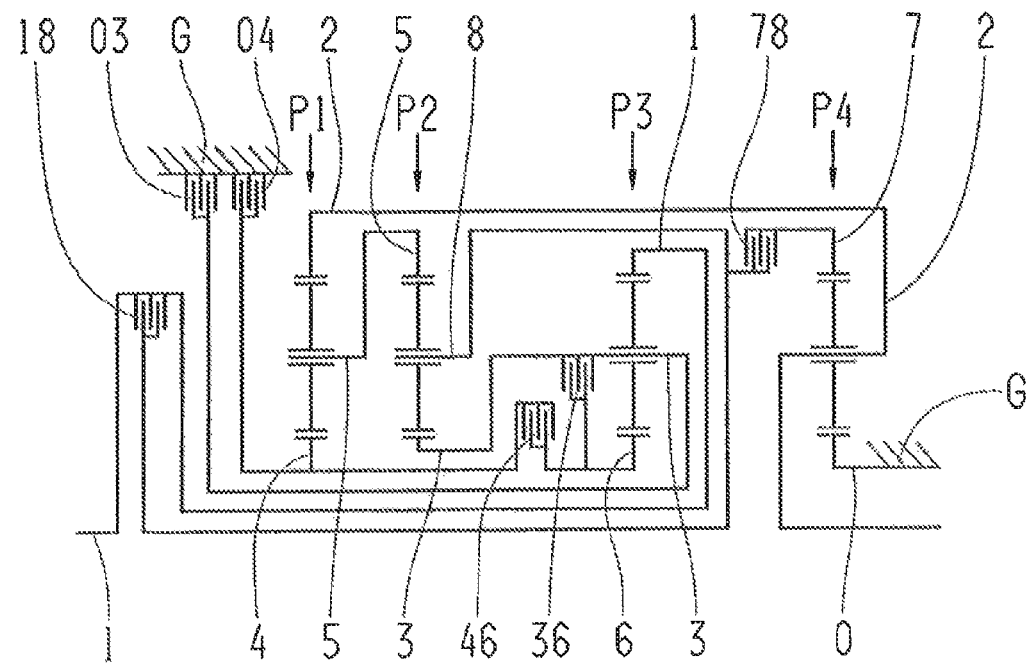
FIG. 4: A schematic representation of a further preferred embodiment of a multi-stage transmission according to the invention.

The transmission shown in FIG. 4 differs from the example embodiment according to FIG. 3 in that the first clutch 13 is replaced by a sixth clutch 36, which detachably connects the third shaft 3 to the sixth shaft 6. By closing the first clutch 13 or the sixth clutch 36, the third planetary gearset P3 is blocked.

The object of FIG. 5 is an example shifting scheme for a multi-stage transmission according to FIG. 3. In the example shown, the values for the fixed transmission ratios of the planetary gearsets P1, P2, P3, P4 designed in the form of minus planetary gearsets are −3.900, −2.146, −1.634 and −3.045 respectively.

The first forward gear is obtained by closing the second brake 04 and the fifth and fourth clutches 46, 78, the second forward gear by closing the second brake 04 and the first and fourth clutches 13, 78, the third forward gear by closing the first, fifth and fourth clutches 13, 46, 78, the fourth forward gear by closing the first, third and fourth clutches 13, 18, 78, the fifth forward gear, which in the example shown is designed to be a direct gear, is obtained by closing the first, fifth and third clutches 13, 46, 18, the sixth forward gear by closing the second brake 04 and the first and third clutches 13, 18, the seventh forward gear by closing the second brake 04 and the fifth and third clutches 46, 18, the eighth forward gear by closing the first and second brakes 03, 04 and the third clutch 18, and the ninth forward gear is obtained by closing the first brake 03 and the fifth and third clutches 46, 18, whereas the reverse gear is obtained by closing the first brake 03 and the fifth and fourth clutches 46, 78.

Alternatively the fourth forward gear can be engaged by other shifting combinations, which are indicated as M is FIG. 5. Thus, the fourth forward gear can be obtained by closing the first brake 03 and the third and fourth clutches 18, 78, or by closing the second brake 04 and the third and fourth clutches 18, 78, or by closing the fifth, third and fourth clutches 46, 18, 78.

In the case when, in the embodiment according to FIG. 4, the first clutch 13 has been replaced by a sixth clutch 36 which connects the third shaft 3 detachably to the sixth shaft 6, in the shifting scheme of FIG. 5 the first clutch 13 is replaced by the sixth clutch 36.

According to the invention, it is also optionally possible to provide additional freewheels at any suitable point in the multi-stage transmission, for example between a shaft and the housing or to connect two shafts when necessary.

On the drive input side or on the drive output side an axle differential and/or a transfer box differential can be arranged.

In an advantageous further development of the invention the drive input shaft 1 can if necessary be separated from a drive engine by a clutch element, wherein for the clutch element a hydrodynamic converter, a hydraulic clutch, a dry starting clutch, a wet starting clutch, a magnetic power clutch or a centrifugal force clutch can be used. It is also possible to arrange a starting element behind the transmission in the force flow direction, and in that case the drive input shaft 1 is connected permanently to the crankshaft of the drive engine.

The multi-stage transmission according to the invention also enables a torsion oscillation damper to be arranged between the drive engine and the transmission.

In a further embodiment of the invention (not illustrated), it is possible to arrange on any shaft, preferably on the drive input shaft 1 or the drive output shaft 2, a wear-free brake such as a hydraulic or electric retarder or the like, this being particularly appropriate for use in commercial vehicles. Furthermore, a power-take-off drive can be provided on any shaft, preferably on the drive input shaft 1 or the drive output shaft 2, for driving additional aggregates.

The frictional shifting elements used can be in the form of powershift clutches or brakes. In particular, friction-locking clutches or brakes such as disk clutches, band brakes and/or cone clutches can be used.

A further advantage of the multi-stage transmission proposed herein is that an electric machine can be connected to any shaft as a generator and/or as an additional drive machine.

INDEXES

0 Shaft
1 First shaft, drive input shaft
2 Second shaft, drive output shaft
3 Third shaft
4 Fourth shaft
5 Fifth shaft
6 Sixth shaft
7 Seventh shaft
8 Eighth shaft
03 First brake
04 Second brake
13 First clutch
16 Second clutch
18 Third clutch
36 Sixth clutch
46 Fifth clutch
78 Fourth clutch
G Housing
P1 First planetary gearset P2 Second planetary gearset
P3 Third planetary gearset
P4 Fourth planetary gearset
i Transmission ratio
φ Gear interval

The invention claimed is:

1. A multi-stage transmission of a planetary design for a motor vehicle, the multi-stage transmission comprising:
   a drive input shaft (1) and a drive output shaft (2);
   first, second, third and fourth planetary gearsets (P1, P2, P3, P4) being arranged within a housing (G), and each of the first planetary gearset (P1), the second planetary gearset (P2), the third planetary gearset (P3) and the fourth planetary gearset (P4) comprises a sun gear, a ring gear and a carrier;
   third, fourth, fifth, sixth, seventh and eighth rotating shafts (3, 4, 5, 6, 7, 8);
   first and second brakes (03, 04) and first, second, third and fourth clutches (13, 16, 18, 78), and selective engagement of the first brake (03), the second brake (04), the first clutch (13), the second clutch (16), the third clutch (18) and the fourth clutch (78) produces various transmission ratios between the drive input shaft (1) and the drive output shaft (2) such that nine forward gears and one reverse gear can be implemented;
   the sun gear of the first planetary gearset (P1) being connected to the fourth shaft (4), and the fourth shaft (4) being connected to the sun gear of the third planetary gearset (P3) and the fourth shaft (4) being connectable, via the second brake (04), to the housing (G);
   the drive input shaft (1) being connectable, via the first clutch (13), to the third shaft (3), the third shaft (3) being connected to the carrier of the third planetary gearset (P3) and the sun gear of the second planetary gearset (P2) and the third shaft (3) being connectable, via the first brake (03), to the housing (G);
   the drive input shaft (1) being connectable, via the second clutch (16), to the sixth shaft (6), and the sixth shaft (6) being connected to the ring gear of the third planetary gearset (P3) and the drive input shaft (1) being connectable, via the third clutch (18), to the eighth shaft (8), the eighth shaft (8) being connected to the carrier of the second planetary gearset (P2) and the eighth shaft (8) being connectable, via the fourth clutch (78), to the seventh shaft (7), and the seventh shaft (7) being connected to the ring gear of the fourth planetary gearset (P4);
   the fifth shaft (5) being connected to the ring gear of the second planetary gearset (P2) and to the carrier of the first planetary gearset (P1);
   the drive output shaft (2) being connected to the carrier of the fourth planetary gearset (P4) and to the ring gear of the first planetary gearset (P1); and
   the sun gear of the fourth planetary gearset (P4) being connected to the housing (G).

2. The multi-stage transmission according to claim 1, wherein the first, the second, the third and the fourth planetary gearsets (P1, P2, P3, P4) are each designed as minus planetary gearsets.

3. The multi-stage transmission according to claim 1, wherein the first, the second, the third and the fourth planetary gearsets, when viewed axially, are sequentially arranged as the first planetary gearset (P1), the second planetary gearset (P2), the third planetary gearset (P3) and the fourth planetary gearset (P4).

4. The multi-stage transmission according to claim 1, wherein a first forward gear is implemented by engagement of the second brake (04) and the second and fourth clutches (16, 78),
   a second forward gear is implemented by engagement of the second brake (04) and the first and the fourth clutches (13, 78),
   a third forward gear is implemented by engagement of the first, the second and the fourth clutches (13, 16, 78),
   a fourth forward gear is implemented by engagement of the third and the fourth clutches (18, 78) and one of the first clutch (13), the second clutch (16), the first brake (03) and the second brake (04),
   a fifth forward gear is implemented by engagement of the first, the second and the third clutches (13, 16, 18),
   a sixth forward gear is implemented by engagement of the second brake (04) and the first and the third clutches (13, 18),
   a seventh forward gear is implemented by engagement of the second brake (04) and the second and the third clutches (16, 18),
   an eighth forward gear is implemented by engagement of the first and the second brakes (03, 04) and the third clutch (18),
   a ninth forward gear is implemented by engagement of the first brake (03) and the second and the third clutches (16, 18), and
   the reverse gear is implemented by engagement of the first brake (03) and the second and the fourth clutches (16, 78).

5. The multi-stage transmission according to claim 4, wherein the fourth forward gear is implemented by engagement of the third and the fourth clutches (18, 78) and the first clutch (13).

6. The multi-stage transmission according to claim 4, wherein the fourth forward gear is implemented by engagement of the third and the fourth clutches (18, 78) and the first brake (03).

7. The multi-stage transmission according to claim 4, wherein the fourth forward gear is implemented by engagement of the third and the fourth clutches (18, 78) and the second brake (04).

8. The multi-stage transmission according to claim 4, wherein the fourth forward gear is implemented by engagement of the second, the third and the fourth clutches (16, 18, 78).

9. The multi-stage transmission according to claim 1, wherein the drive input shaft (1) is connected, via a shift element, to the ring gear of the third planetary gearset (P3) and is connectable, via another shift element, to the sun gear of the second planetary gearset (P2).

10. A multi-stage transmission of a planetary design for a motor vehicle, the multi-stage transmission comprising:
    a drive input shaft (1) and a drive output shaft (2);
    first, second, third and fourth planetary gearsets (P1, P2, P3, P4) being arranged within a housing (G), and each of the first planetary gearset (P1), the second planetary gearset (P2), the third planetary gearset (P3) and the fourth planetary gearset (P4) comprises a sun gear, a ring gear and a carrier;
    third, fourth, fifth, sixth, seventh and eighth rotating shafts (3, 4, 5, 6, 7, 8);
    first and second brakes (03, 04) and first, second, third and fourth clutches (13, 46, 18, 78), and selective engagement of the first brake (03), the second brake (04), the first clutch (13), the second clutch (46), the third clutch (18) and the fourth clutch (78) produces various transmission ratios between the drive input shaft (1) and the drive output shaft (2) such that nine forward gears and one reverse gear can be implemented;

the sun gear of the first planetary gearset (P1) being connected to the fourth shaft (4), the fourth shaft (4) being connectable via the second clutch (46) to the sixth shaft (6), the sixth shaft (6) being connected to the sun gear of the third planetary gearset (P3), the fourth shaft (4) also being connectable, via the second brake (04), to the housing (G), and thereby the sun gear of the third planetary gearset (P3) being connectable, via the sixth shaft (6), the fourth shaft (4), the second brake (04) and the second clutch (46), to the housing (G);

the drive input shaft (1) being connectable, via the first clutch (13), to the third shaft (3), the third shaft (3) being connected to the carrier of the third planetary gearset (P3) and the sun gear of the second planetary gearset (P2) and the third shaft (3) being connectable, via the first brake (03), to the housing (G);

the drive input shaft (1) being directly connected to the ring gear of the third planetary gearset (P3);

the drive input shaft (1) being connectable, via the third clutch (18), to the eighth shaft (8);

the eighth shaft (8) being connected to the carrier of the second planetary gearset (P2), and the eighth shaft (8) being connectable, via the fourth clutch (78), to the seventh shaft (7);

the seventh shaft (7) being connected to the ring gear of the fourth planetary gearset (P4);

the fifth shaft (5) being connected to the ring gear of the second planetary gearset (P2) and to the carrier of the first planetary gearset (P1);

the drive output shaft (2) being connected to the carrier of the fourth planetary gearset (P4) and to the ring gear of the first planetary gearset (P1); and the sun gear of the fourth planetary gearset (P4) being connected to the housing (G).

11. A multi-stage transmission of a planetary design for a motor vehicle, the multi-stage transmission comprising:

a drive input shaft (1) and a drive output shaft (2);

first, second, third and fourth planetary gearsets (P1, P2, P3, P4) being arranged within a housing (G), and each of the first planetary gearset (P1), the second planetary gearset (P2), the third planetary gearset (P3) and the fourth planetary gearset (P4) comprises a sun gear, a ring gear and a carrier;

third, fourth, fifth, sixth, seventh and eighth rotating shafts (3, 4, 5, 6, 7, 8);

first and second brakes (03, 04) and first, second, third and fourth clutches (36, 46, 18, 78), and selective engagement of the first brake (03), the second brake (04), the first clutch (36), the second clutch (46), the third clutch (18) and the fourth clutch (78) produces various transmission ratios between the drive input shaft (1) and the drive output shaft (2) such that nine forward gears and one reverse gear can be implemented;

the sun gear of the first planetary gearset (P1) being connected to the fourth shaft (4), the fourth shaft (4) being connectable, via the second clutch (46), to the sixth shaft (6) which is connected to the sun gear of the third planetary gearset (P3), and the fourth shaft (4) being connectable, via the second brake (04), to the housing (G);

the sixth shaft (6) being connectable, via the first clutch (36), to the third shaft (3);

the third shaft (3) being connected to the carrier of the third planetary gearset (P3) and the sun gear of the second planetary gearset (P2), and the third shaft (3) being connectable, via the first brake (03), to the housing (G);

the drive input shaft (1) being connected to the ring gear of the third planetary gearset (P3), and the drive input shaft (1) being connectable, via the third clutch (18), to the eighth shaft (8);

the eighth shaft (8) being connected to the carrier of the second planetary gearset (P2), and the eighth shaft (8) being connectable, via the fourth clutch (78), to the seventh shaft (7);

the seventh shaft (7) being connected to the ring gear of the fourth planetary gearset (P4);

the fifth shaft (5) being connected to the ring gear of the second planetary gearset (P2) and to the carrier of the first planetary gearset (P1);

the drive output shaft (2) being connected to the carrier of the fourth planetary gearset (P4) and to the ring gear of the first planetary gearset (P1); and the sun gear of the fourth planetary gearset (P4) being connected to the housing (G).

* * * * *